(12) United States Patent
Wakabayashi

(10) Patent No.: US 6,572,504 B2
(45) Date of Patent: Jun. 3, 2003

(54) SILENT CHAIN WITH A GUIDE WASHER HAVING A SINGLE CENTRAL APERTURE FOR A CENTER PIN

(75) Inventor: Shozo Wakabayashi, Mie (JP)

(73) Assignee: Borg-Warner Automotive, K.K., Nabari (JP)

( * ) Notice: Subject to any disclaimer, the term of this patent is extended or adjusted under 35 U.S.C. 154(b) by 44 days.

(21) Appl. No.: 09/776,613

(22) Filed: Feb. 2, 2001

(65) Prior Publication Data

US 2001/0019977 A1 Sep. 6, 2001

(30) Foreign Application Priority Data

Feb. 24, 2000 (JP) .......................................... 2000-47520

(51) Int. Cl.[7] .............................................. F16G 13/04
(52) U.S. Cl. ...................................... 474/214; 474/215
(58) Field of Search ................................. 474/212, 213, 474/214, 215, 230, 231, 233, 220, 223, 206, 207, 228, 229; 411/529

(56) References Cited

U.S. PATENT DOCUMENTS

| | | | | |
|---|---|---|---|---|
| 1,563,065 A | * | 11/1925 | Belcher | 474/215 |
| 1,598,906 A | | 9/1926 | Dull | |
| 2,525,561 A | | 10/1950 | Pierce | 74/251 |
| 2,602,344 A | | 7/1952 | Bremer | 74/250 |
| 2,775,156 A | * | 12/1956 | Imse et al. | 474/231 |
| 3,877,688 A | * | 4/1975 | McCarty | 474/220 |
| 4,041,790 A | * | 8/1977 | Paul | 474/220 |
| 4,186,617 A | * | 2/1980 | Avramidis et al. | 474/229 |
| 5,176,584 A | * | 1/1993 | Ishida et al. | 474/213 |
| 5,345,753 A | | 9/1994 | Okuda et al. | |
| 5,372,554 A | * | 12/1994 | Okuda | 474/206 |
| 5,445,570 A | | 8/1995 | White | 474/213 |
| 5,464,374 A | | 11/1995 | Mott | 474/224 |
| 6,142,903 A | * | 11/2000 | Heinrich | 474/215 |

FOREIGN PATENT DOCUMENTS

| | | |
|---|---|---|
| GB | 260510 | 11/1926 |
| GB | 305167 | 8/1929 |
| GB | 317467 | 6/1930 |

OTHER PUBLICATIONS

European Search Report, Appln. No. 01301527.6, Applicant: Borg–Warner Automotive K.K., 4 pages.

* cited by examiner

*Primary Examiner*—Marcus Charles
(74) *Attorney, Agent, or Firm*—Sidley Austin Brown & Wood LLP; Hugh A. Abrams; Greg Dziegielewski

(57) ABSTRACT

A silent chain is directed to prevent bending of the connection pin and reducing surface pressure acting on the connection pin while maintaining bendability of the entire chain. The chain includes multiple link plates, each having a pair of teeth and a pair of pinholes. The links are interleaved in the transverse and longitudinal directions and the link plates are connected by connection pins inserted in the pinholes. Connection pin is composed of center pin at the center of pinhole and of a pair of rocker pins on both sides of said center pin. Guide washer is provided to each connection pin. Guide washer has a guide part extending on both sides of the teeth of link plate and a central apertures for fixing of the end of center pin.

9 Claims, 4 Drawing Sheets

SILENT CHAIN WITH A GUIDE WASHER HAVING A SINGLE CENTRAL APERTURE FOR A CENTER PIN

The subject matter of this application relates to the subject matter of application Ser. No. 09/776,342, filed Feb. 2, 2001, entitled "A Silent Chain With A Guide Washer Having A Single Aperture For A Rocker Joint Pin."

This invention relates to a silent chain and, in particular, to the structure of a guide link washer for a silent chain.

BACKGROUND OF THE INVENTION

Conventionally, a silent chain is used as a power transmission chain. FIGS. 6 and 7 show an example of a typical silent chain.

As shown in the figures, silent chain 100 has a multiple link plate 102 having a pair of teeth 121. The links are interleaved in the transverse and longitudinal directions. The link plate 102 is pivotably connected by connection pin 103, composed of a pair of long and short joint pins 131 and rocker pins 132, which are inserted into pinhole 122 of link plate 102. Guide link 104 is placed on the outside of outermost link plate 102. Both ends of joint pin 131 are fixed to pinholes formed in guide link 104.

When the chain runs on a sprocket during its operation, the link plates bend and, at such time, joint pin 131 makes rolling contact with the sliding surface of 132.

Recently, silent chain power transmission has been used under high load conditions and, for this, a silent chain of high wear resistance is required. However, when a conventional silent chain is used under high load, very high contact surface pressure is generated in the contact surfaces of the joint pin and rocker pin due to their convex—convex contact and, as a result, pitting wear occurs in those pins. Therefore, the requirement for high wear resistance cannot be adequately satisfied by the conventional silent chain.

The increased radius of curvature of the rolling surface of each pin can decrease contact surface pressure between joint pin and rocker pin, but a larger radius of curvature reduces the bendability of the link plates and that of the entire chain. As a result, it becomes difficult for the chain to be wrapped or wound around a small diameter sprocket. Therefore, increase of radius of curvature of the rolling surface is limited to ensure bendability of the entire chain.

In a conventional silent chain, both ends of the joint pin are fixed to a guide link of higher rigidity than link plates in general, so that, when excessive tensile load, such as a prestressing load, is applied to a chain, the shear load from the link plate acts on the center part of the joint pin while stretching of the pitch of the holes in the guide row is suppressed and, as a result, the bending load acts on the joint pin and the center of the joint pin and rocker pin can warp.

This invention addresses such a conventional problem and it offers a silent chain that retains the bendability of the entire chain, reduces the surface pressure acting on the connection pin and prevents or minimizes bending of the connection pin.

SUMMARY OF THE INVENTION

In one embodiment, the connection pin of the chain of the present invention is shown in FIG. 3. In the figure, link plates 2a, 2b are mutually bent. Incidentally, the bending angle here is given as $\alpha$. Connection pin 3 that pivotably supports the said link plates 2a, 2b is inserted in aperture 22 formed in each of link plates 2a, 2b.

Connection pin 3 is composed of center pin 31 placed in the center of pinhole 22 and the opposing pair of rocker pins 32 on both sides of said center pin. Both side faces of center pin 31 are curved convex, and convex curved face 32a, corresponding to side face 31a of the center pin, is formed in rocker pin 32.

For a conventional rocker joint-type silent chain (FIGS. 6 and 7), rolling contact with angle $\alpha$ is necessary at the contact between rocker pin 132 and joint pin 131 to produce bending angle $\alpha$.

Whereas in the present invention, rocker pins 32 are placed on both sides of center pin 31, as shown in FIG. 3. Therefore, if rolling contact with angle $\alpha/2$ for each rocker pin 32 is realized, then bending angle $\alpha$ can be realized between adjacent link plates 2a, 2b.

Therefore, in the present invention, rolling contact of the rocker pin with one half of the necessary rolling contact angle suffices, so that the radius of curvature of each pin can be increased by that much; thereby, the surface pressure of the contact surface of the pin can be reduced while bendability of the entire chain is kept and wear resistance is improved.

Guide washers corresponding to each connection pin are provided to the chain of the invention and the end of the center pin is fixed to the pinhole of the guide washer. Therefore, stretching of the hole pitch of the guide row is not restricted, even if excessive tensile load, such as a prestressing load is added to a chain and the shear load from the link plate acts on the joint pin and no bending load acts on the joint pin, so that bending of the joint pin and rocker pin is prevented.

The preferred cross-section of the center pin is shaped like a Japanese drum or general ellipse. That is, a shape with the center of both side faces curved convex outward.

Convex opposing faces of the rocker pin are curved concave or convex. The entire length of the rocker pin is equal to or slightly longer than the total width of the laminated link plates and shorter than the distance between opposing guide washers in the chain width direction.

That is, in this case, guide washers are placed independently to each connection pin so that even if the entire length of the rocker pin is somewhat longer than the total width of the laminated link plates, it does not interfere with the attachment of the guide washer. In this manner, the length of the rocker pin has a large tolerance for ease of dimension control.

Whereas in a conventional silent chain, the guide link has a pair of pinholes on both of its ends (see FIGS. 6 and 7) so that it is preferable to have the entire length of the rocker pin shorter than the total width of the interleaved link plates. In such case, both ends of the rocker pin need not be too deep inside the pinholes of the outermost link plate, so that the entire length of the rocker pin needs to be close to the total width of the link plates. Because of this reason, tolerance on the rocker pin length of a conventional silent chain is tight and its dimensional control is not easy.

In the present invention, the entire length of the rocker pin is longer than the total width of the link plates, so that an effective cross-sectional area of the connection pin can be uniform across the total width of the link plates.

The guide washer can also have a blade spring portion. In such case, the elastic force of the blade spring acts in the chain width direction and a frictional force is generated between adjacent link plates in the chain width direction for high bending resistance of the chain and reduced chordal vibration of the chain.

DETAILED DESCRIPTION OF THE PREFERRED EMBODIMENTS

A practical example of this invention is explained below with the attached figures.

Figure 1:
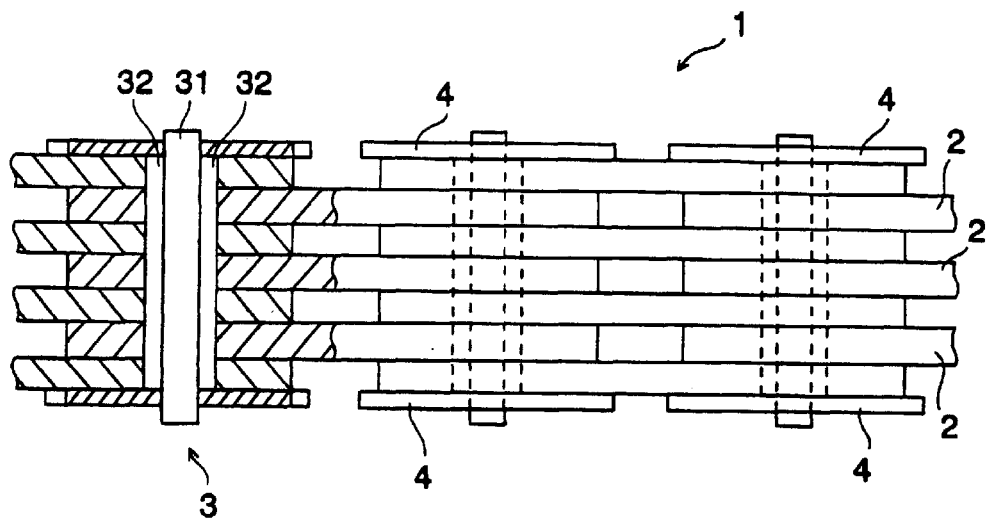
FIG. 1 illustrates a side view of the silent chain of a practical example of this invention.
Figure 2:
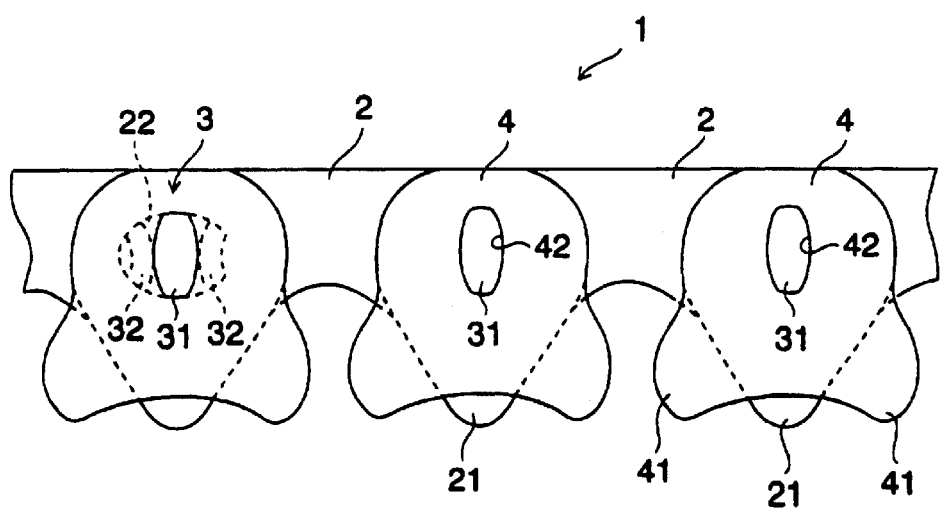
FIG. 2 shows a front view of the silent chain of FIG. 1.
Figure 3:
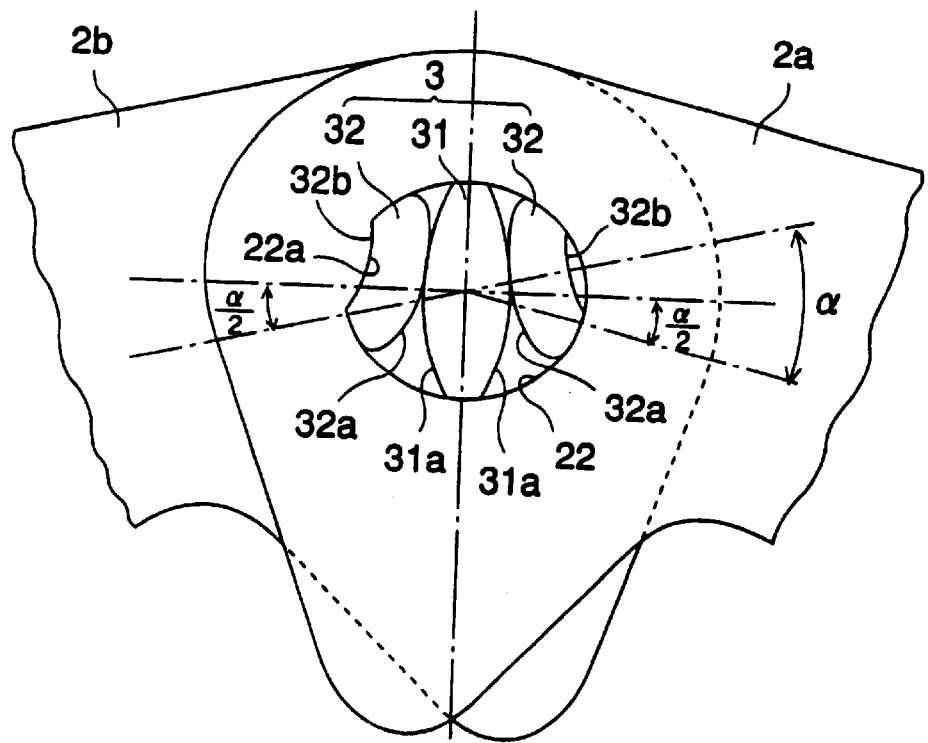
FIG. 3 shows an enlargement of the connection pin of the silent chain of FIG. 1.
Figure 4:
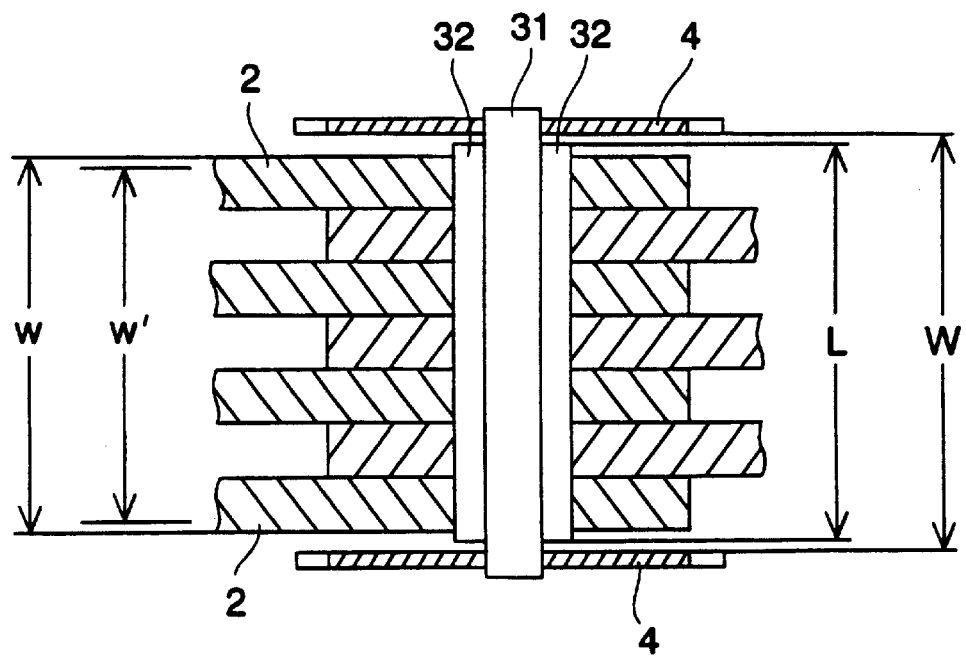
FIG. 4 is a partial enlargement of FIG. 1.
Figure 5:
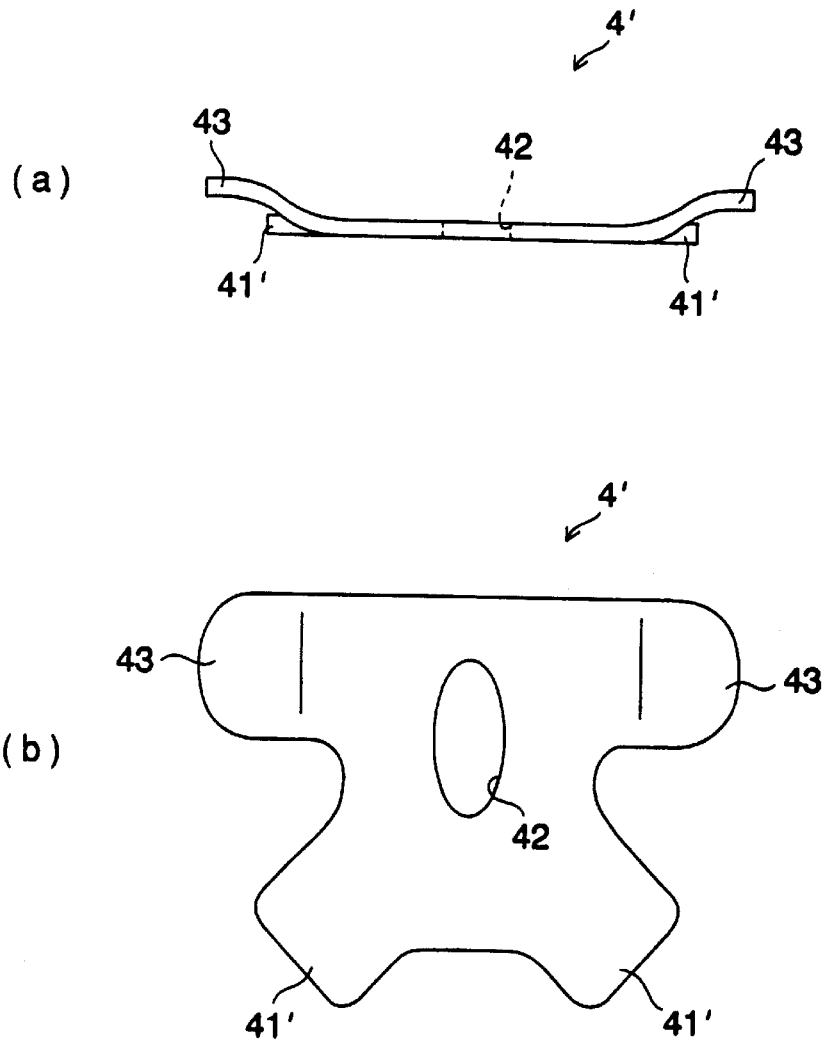
FIG. 5 is a modification of the guide washer where (a) is a top view and (b) is a front view.

FIG. 1 is a side view of the silent chain of a practical example of this invention. FIG. 2 is a front view of the silent chain of FIG. 1. FIG. 3 is an enlargement of the connection pin of the silent chain of FIG. 1. FIG. 4 is a partial enlargement of FIG. 1 and FIG. 5 shows a modified guide washer where (a) is a top view and (b) is a front view.

As shown in FIGS. 1 and 2, silent chain 1 is composed of multiple link plates 2, each having a pair of teeth 21 and a pair of pinholes 22. The links are interleaved in the transverse and longitudinal directions, and connection pin 3 inserted in pinhole 22 of said link plates, which pivotally support said link plates 2.

As is clear in FIG. 3, connection pin 3 is composed of center pin 31 in the center of pinhole 22 and a pair of opposing rocker pins 32 on both sides of the said center pin. Center pin 31 has convex curved side faces 31*a* and is in the shape of a Japanese drum or general ellipse in cross-section. Rocker pin 32 has convex curved face 32*a* that contacts side face 31*a* of center pin 31. Concave curved face 32*b* is formed opposite to convex curved face 32*a* of rocker pin 32. Concave curved face 32*b* of one rocker pin 32 contacts convex sheet surface 22*a*, formed in pinhole 22 of link plate 2, and center pin 31 is longer than the rocker pin 32 (see FIG. 1).

Guide washer 4 is placed outside outermost link plate 2. Guide washer 4 is provided to each connection pin 3. As shown in FIG. 2, guide washer 4 has a pair of guide parts 41 that extend on both sides of teeth 21 of link plate 2. The guide part 41 is provided to keep the silent chain at a set position on the sprocket (not shown). Pinhole 42 is formed at the center of guide washer 4 and the end of center pin 31 is inserted into pinhole 42 and fixed therein by staking, etc.

Next, the length of rocker pin 32 is detailed with the aid of FIG. 4. FIG. 4 is a partial enlargement of FIG. 1 and the gap between the outermost link plate 2 and guide washer 4 is exaggerated for the purpose of explanation.

Then the total length of rocker pin 32, total width of interleaved link plate 2, maximum length of rocker pin 32 as rocker pin 32 is put in the pinhole of outermost link plate 2 and the distance between the two guide washers 4, 4 are given in FIG. 4 as L, W, w' ($\approx$w) and W, respectively, the relation there is $$w' \leq L < W, \text{ preferably } w \leq L < W.$$

Incidentally, w'$\approx$w indicate that w' is smaller than W and, in this case, as close as w.

That is, total length L of rocker pin 32 is equal to or longer than maximum length w' of rocker pin 32 when rocker pin 32 is inside the pinhole of outermost link plate 2 and, at the same time, it is shorter than the distance W between the two guide washers opposing in the chain width direction. Preferably, total length L of rocker pin 32 is equal to or longer than total width w of laminated link plate 2 and is shorter than distance W between both guide washers 4, 4.

Since guide washer 4 is provided independently to each connection pin 3, attachment of guide washer 4 is not impeded even if the total length L of rocker pin 32 is slightly longer than the total width w of laminated link plate 2. In this manner, the tolerance on the length of rocker pin 32 is loose for ease of dimensional control.

Figure 6:
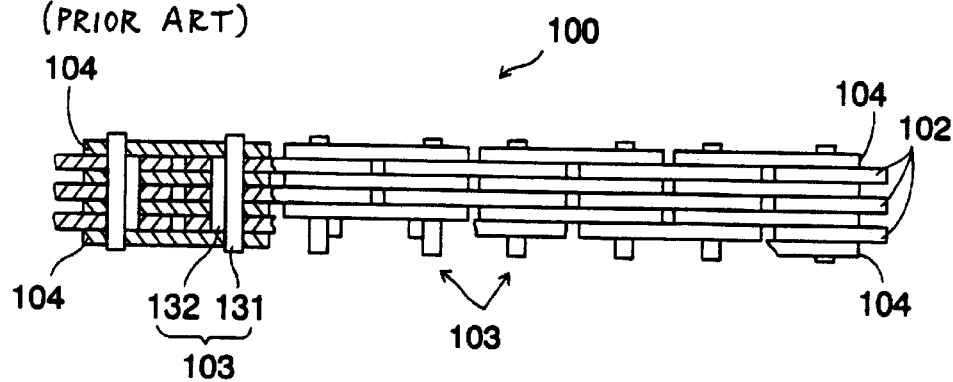
FIG. 6 is a top view of a conventional silent chain.
Figure 7:
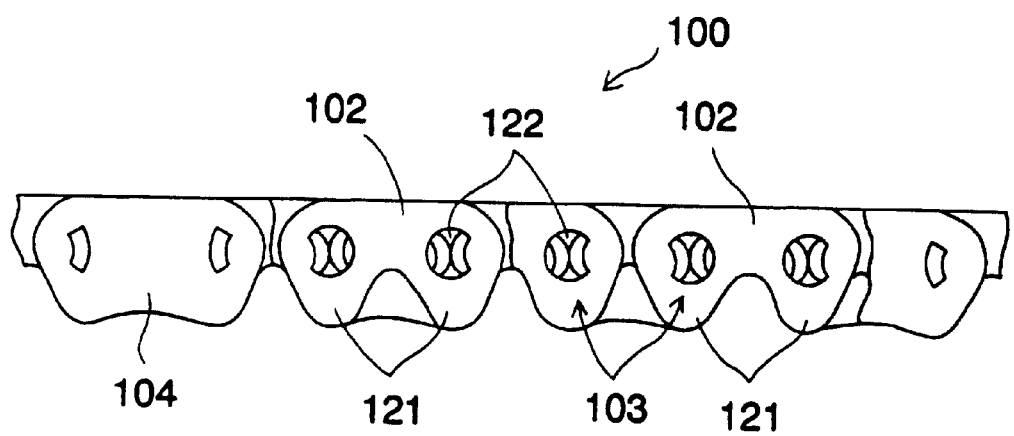
FIG. 7 is a front view of a conventional silent chain.

Whereas, in a conventional silent chain, the guide link has a pair of pinholes on both its ends (see FIGS. 6 and 7), it is preferable to have the total length L of the rocker pin shorter than total width w of the laminated link plate for unforced attachment of the guide link to both pinholes, even if the length of the rocker pin in one pinhole and that in the other pinhole are different from each other.

In such case, both ends of the rocker pin need to be not too deep in the pinhole of the outermost link plate so that the total length of the rocker pin needs to be close to the total width of the link plates. That is, for a conventional silent chain, the relationship w'$\leq$L<w must be met.

As shown above, in a conventional silent chain, the tolerance on the length of the rocker pin is tight and dimensional control is difficult because w' and w are very close to each other.

Next, in FIG. 3, showing the details of the connection pin of silent chain 1, link plates 2*a*, 2*b*, placed at a right angle to the paper sheet surface are mutually bent. When the bending angle of the link plates is given as $\alpha$, bending angle $\alpha$ can be produced for adjacent link plates 2*a*, 2*b* if the rolling contact with $\alpha$/2 angle is realized by each rocker pin 32 because rocker pins 32 are placed on both sides of each center pin 31.

Whereas, in a conventional rocker joint-type silent chain (FIGS. 6 and 7), rolling contact with angle $\alpha$ is necessary at the contact part between rocker pin 132 and joint pin 131 to obtain bending angle $\alpha$.

As shown above, rolling contact of each rocker pin 32 with one half of the necessary rolling contact angle suffices for this practical example, so that the radius of curvature of pins 31, 32 can be increased by that much and the surface pressure at the contact of the pin can be reduced while bendability of the entire chain is maintained and wear resistance is improved.

In addition, in this case, guide washer 4 is provided to each connection pin 3 and the end of center pin 31 is fixed to pinhole 42 of guide washer 4. Thereby, stretching of the hole pitch of the guide row is not restricted, even if excessive tensile load such as the prestressing load is added to a chain and the shear load from the link plates 2 acts on joint pin 32 while no bending load acts on joint pin 32, so that bending of joint pin 32 and rocker pin 31 is prevented.

In a conventional silent chain, stretching of pitch due to friction appeared mainly in the link plates of the link row and not in the link plates in the guide row because the joint pin is fixed to the guide link. This has caused an uneven extension of pitch. Whereas in this practical example the guide row and the link row are not different from each other because of the use of the guide washer, the pitch extension is uniform across the entire chain.

The above practical example has convex curved seat surface 22*a* formed in pinhole 22 of link plate 2 but the seat surface can be concave curved too. In such case, convex curved faces are formed on both sides of rocker pin 32 and each rocker pin 32 has a Japanese-drum-shaped cross-section similar to that of center pin 31.

The above practical example has a flat-plate-like guide washer, but blade-spring-like guide washer 4', as shown in FIG. 5, can be used also. Incidentally, the same reference numerals as in the said practical example indicate the corresponding parts.

Guide washer 4' in FIG. 5 has a pair of near rectangular guide parts 41' and guide washer 4' has blade spring 43, that extends to both sides and bends up or down, formed in it. In this case, the elastic force of blade spring 43 acts in the chain width direction to add a frictional force to the adjacent link plates and thereby the bending resistance of the chain increases, the chordal vibration of the chain is suppressed and noise due to chordal vibration is reduced.

As detailed above, the connection pin of the silent chain of this invention is composed of a center pin in the center of a pinhole and a pair of opposed rocker pins on both sides of the center pin, therefore, rolling contact of the rocker pin with the center pin at one half of the necessary bending angle suffices to produce the necessary bending angle of the chain, so that the radius of curvature of each pin can be increased by that much and, as a result, the surface pressure of the contact area of each pin is reduced and wear resistance is improved.

In addition, a guide washer is provided to each connection pin in this invention so that stretching of the hole pitch in the guide row is not restricted, even when excessive tensile load such as a prestressing load is added to the chain, the shear load from the link plates acts on the joint pin and no bending load acts on the joint pin. As a result, bending of the joint pin and rocker pin is prevented.

What is claimed is:

1. A silent chain, comprising:

a plurality of interleaved rows of link plates, pin members connecting adjacent rows of link plates, each link plate defining a pair of apertures for receiving said pin members, each link plate having a pair of teeth extending therefrom;

each said pin member including a center pin, said center pin being disposed in the center of one of said apertures of said link plate, a pair of rocker pins disposed on both sides of said center pin, said center pin having convex curved faces and said rocker pins having convex curved faces contacting said convex curved faces of said center pin, said rocker pins having a shorter length than that of said center pin; and a plurality of guide washers, each of said guide washers corresponding to each pin member and being press-fitted on the ends of the center pins, each guide washer having a laterally extending guiding portion and an aperture for receiving said center pin.

2. The silent chain of claim 1, wherein said center pin is a general ellipse shape in cross-section.

3. The silent chain of claim 1 wherein the entire length of each rocker pin is equal to or longer than the entire width of said rows of link plates.

4. The silent chain of claim 1 wherein the entire length of each rocker pin is shorter than the distance between the opposed guide washers in the chain width direction.

5. The silent chain of claim 1 wherein each said guide washer has a downwardly extending skirt portion that extends below the washer aperture.

6. The silent chain of claim 1 wherein each said guide washer has only a single aperture for receiving said center pin.

7. The silent chain of claim 1 wherein each said guide washer is substantially flat in the longitudinal direction.

8. The silent chain of claim 1 wherein said guide washer includes a blade spring portion biasing said link plate in the chain width direction.

9. The silent chain of claim 8 wherein said guide washer is slightly curved in the longitudinal direction.

* * * * *